May 8, 1945.  S. GORDON  2,375,645

DENTAL PLATE CONTAINER

Filed Jan. 19, 1944

Inventor
Samuel Gordon.
By
Attorney.

Patented May 8, 1945

2,375,645

UNITED STATES PATENT OFFICE 2,375,645

DENTAL PLATE CONTAINER

Samuel Gordon, Stamford, Conn.

Application January 19, 1944, Serial No. 518,891

2 Claims. (Cl. 206—1)

The invention is directed to a dental plate container, constructed primarily as a completely sanitary, protective, and readily portable container, in which dental plates in full or partial form, bridge work and like dental accessories, may be housed, with protective safety and sanitary protection.

Dental-plate containers embodying the necessary essential characteristics are, so far at least as commercially known, entirely wanting on the market, and this notwithstanding the obvious need and great convenience and utility of such a container. Many wearers of dental plates find such uncomfortable or even painful under a temporary physical distress of the throat or gums, and would appreciate a container in which the dental plate may be quickly and safely concealed in effective sanitary surroundings, and carried in the pocket or purse without external evidence of its character. Again, many wearers of dental plates remove the same at night and keep the removed plates until morning generally immersed in water in an open glass or container. With the traveling public, where dental plate removal is a habit, the service of even such a temporary place of deposit is not always or even generally available, with resultant inconvenience and embarrassment. With the container of the present invention, the user has available at any and all times a completely protective, sanitary container, peculiar to his use alone, to which the dental plate or plates may be quickly transferred or from which they may be with equal facility removed, with the complete knowledge on the part of the user that when in the container, the plates are safely held against damage and protected against contamination from any usual sources.

Another and highly important characteristic of a container according to the invention is the material of which it is constructed. Recognizing the necessity of complete cleanliness of the dental plate and its protection against bacterial contamination when in the container or any external contamination, the container must be a substantially sealed enclosure of a material having inherent protection against bacterial lodgment in any part of the container, and additionally of an internal construction to permit the insertion and withdrawal of the dental plate or plates with the complete absence of any fastening means while preventing the plate or plates against any play which might tend to their injury, and furthermore, and of material importance, the container must be of such convenient overall dimensions as to permit convenient pocket or purse carrying, either empty or with contained dental plates.

The principal object of the invention therefore is the production of a container designed particularly for the temporary retention of dental plates and like dentures, with the container interiorly constructed to readily receive and permit ready and convenient withdrawal of the dentures; of compact readily carried size and contour; having denture-retaining partitions to prevent undue movement of the contained dentures; and constructed of a material to inhibit bacterial growth or contamination of the dentures, and in a form to permit ready disconnection of relatively-movable parts for effective cleaning.

The invention in a preferred form as to detail is illustrated in the accompanying drawing, in which.

Figure 1:
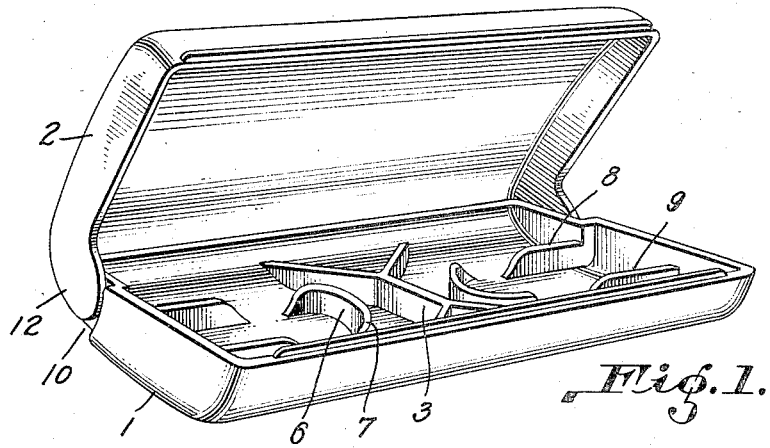
Figure 1 is a perspective view of the container, the cover section being shown open.
Figure 2:
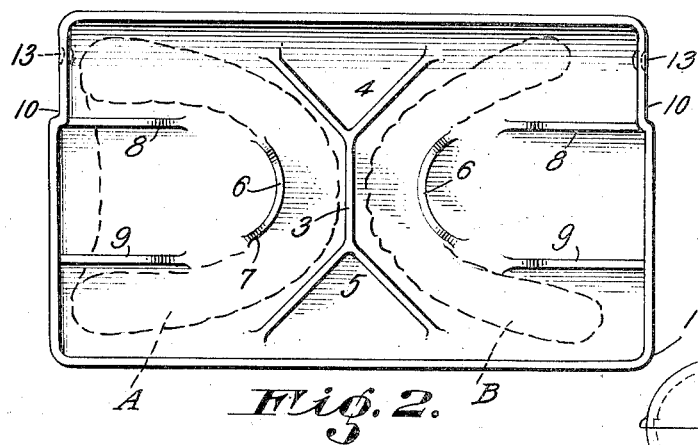
Figure 2 is a plan view, the cover being removed.
Figure 3:
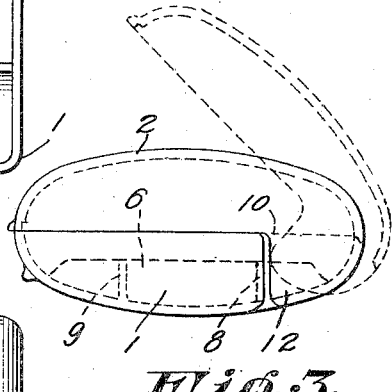
Figure 3 is an end elevation, the cover section being shown partly open in dotted line.
Figure 4:
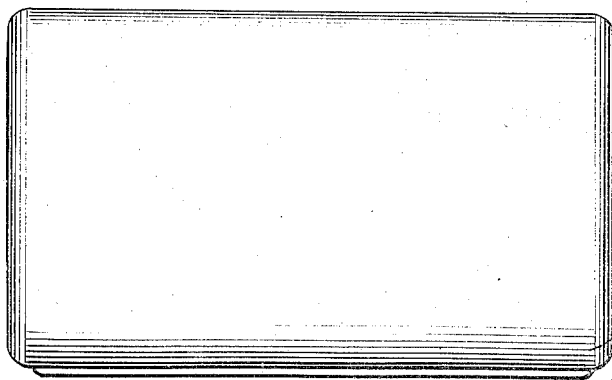
Figure 4 is a plan view.

The improved container includes a body 1 and a cover section 2, the latter constituting the only movable part. The container may be constructed for the reception of a single dental plate or for two such plates, and in either form, differing only in size, and are constructed in such overall dimensions as to just comfortably accommodate the designed dentures, in order that the container may be readily placed in the pocket or purse when desired.

The interior of the body will be described as formed to receive two dentures, and to this end is provided with a central transverse partition 3, extended at each end as divergent sections 4 and 5, terminating short of the side walls of the body. Arranged in spaced relation to the partition 3, and on each side thereof toward the end of the body, is a retaining web 6, the vertical ends of which are upwardly and inwardly curved at 7 for better cooperation with the denture. Extending from each side wall of the body toward the web 6, but terminating short thereof, are two positioning webs 8 and 9, spaced from each other and from the side walls of the body to accommodate the sides of the denture outwardly of said positioning webs.

An important detail of this construction is that the extension of the parts 3, 4, 5, 6, 8 and 9, above the bottom of the body, is less than the height of the denture, in order to accommodate both or either upper and lower dental plates, as indicated in dotted lines in Figure 1. An upper dental plate is shown in the compartment at the left of the partition 3, while a lower dental plate is shown at the right of the partition. The upper dental plate A has of course a bridge to fit against the roof of the mouth, and when this denture is placed in proper position, the forward portion of the denture lies between the portion 3 and the retaining web 6, while the sides of the denture lie respectively on opposite sides, that is, the outer sides of the positioning webs 8 and 9. The divergent sections 4 and 5 at the ends of the partition 3 extending toward the left conform more or less substantially to the outer surface of the sides of the denture near its front and with the retaining web 6 provides a channel-like retaining space for this portion of the denture.

It is to be particularly noted that the vertical height or dimension of any of the parts 3, 4, 5, 6, 8 and 9 is less than the similar dimension of the denture, so that in the case of the upper denture, the roof plate overlies all such parts which in the positioning such roof plate would cover.

In the positioning of a lower denture, as B, the application is the same as that described in connection with an upper denture, as will be evident from the dotted-line showing at the right of partition 3 in Figure 1. The rounded edges 7 of the retaining webs 6 avoid any possible damage to the inner surfaces of the dentures adjacent thereto in applied position.

It will be appreciated from the above that the dentures when in position in the body are held with sufficient play to facilitate easy positioning and removal, without permitting denture movement tending to its possible damage. It is further evident that when positioning both upper and lower dentures, such may be indiscriminately applied on either side of partition 3, as the retaining function and construction is identical on each side.

The cover section 2 must have the capability of practically sealing the body when closed, and yet be easily and simply separated from the body to permit thorough cleaning of the parts. Then the cover is formed in any conventional manner for interfitting with the edges of the body 1, to provide a more or less complete sealing of the body when the cover is closed. For hinging of the body, the sides of the latter at one end are formed with recesses 10, each having a rounded depression 11. The cover 2 has extended ears 12, having instruck tits 13 to seat in the depression. The ears, when the cover is applied, will fit the recesses to a degree to hold the tits 13 in the depressions 11 for full lid hinging function, said ears yielding under slight lateral pressure to free the tits 13 and completely disconnect the cover and body.

A very important detail of the present invention is involved in the material of which the parts are integrally constructed. Such material should be of a nature, owing to the particular use for which it is designed, to absolutely inhibit the collection or growth of bacteria capable of being moulded to avoid corners or the like to retain any material tending to contaminate the dentures, be fully resistant to cleaning fluids, usually hot water, and to be practically unbreakable under ordinary handling or jars. A particularly desirable type of material which is preferred in the manufacture of the container, is a thermosetting and thermoplastic moulding plastic, including phenolics, resins, ureas, cellulose-acetates and others, such as Bakelite, Melmac, Lucite, Tenite, Lumarith and others. This material can be readily formed, inhibits the growth of fungi or bacteria on its surface, will withstand boiling water in cleaning without appreciable deterioration, and is not easily damaged in ordinary handling.

By the particular formation of all parts, especially the hinged connection for the cover as well as the webs, the entire container may be constructed of one material without additional parts, which contributes in no small degree to its sanitary and protective function.

It may be pointed out that the container may be formed to receive a single denture only, being then approximately one-half the length shown in Figure 1, and formed near one end with a partition 3 and single flaring extensions 4 or 5 at each end, together with the described formation of webs 6, 8 and 9 in the same relation as in Figure 1.

The container provides a sanitary, substantially suitable container to receive a dental plate or plates or other dentures for complete protective housing and complete portability, with the denture or dentures held in the container against liability of breakage but without any specific retaining means to interfere with the free insertion and withdrawal of the denture.

The container further provides a sanitary dental container for dental plates, without the use of any liner and with no metal parts, externally or internally, to corrode or gather dirt and the position of the plates when in the box will be end to end.

What I claim is:

1. A two-part container for dental plates completely constructed of plastic material, one part being integrally formed with a central transverse partition having end extensions of V-form, an integral outwardly curved retaining web on each side of and spaced from the transverse partition to provide between such transverse partition and each retaining web a space to somewhat loosely receive the front portion of a dental plate, the V-form extensions preventing lateral play of such plates, and integral positioning webs on each side of and at right angles to the transverse partition to engage inwardly of the rear parts of the dental plates to prevent excessive swinging movement of such plates in either direction, said positioning webs having inner ends adjacent to but spaced outwardly from the ends of the respective curved webs.

2. A construction as defined in claim 1, wherein the height of the curved retaining webs and positioning webs is less than the height of the transverse web.

SAMUEL GORDON.